US008214112B2

United States Patent
Rew et al.

(10) Patent No.: US 8,214,112 B2
(45) Date of Patent: Jul. 3, 2012

(54) ENGINE CONTROL METHOD FOR A VEHICLE WITH IDLE STOP FUNCTION

(75) Inventors: Seunghyun Rew, Uiwang-si (KR); Changyoung So, Gunpo-si (KR); Jongshin Lee, Incheon (KR); Jungjoo Lee, Gunpo-si (KR); Hyeonkyu Lee, Seoul (KR)

(73) Assignee: Kefico Corporation, Gunpo-Si (KR)

( * ) Notice: Subject to any disclaimer, the term of this patent is extended or adjusted under 35 U.S.C. 154(b) by 310 days.

(21) Appl. No.: 12/666,275

(22) PCT Filed: Feb. 14, 2008

(86) PCT No.: PCT/KR2008/000876
§ 371 (c)(1),
(2), (4) Date: Dec. 22, 2009

(87) PCT Pub. No.: WO2009/002002
PCT Pub. Date: Dec. 31, 2008

(65) Prior Publication Data
US 2010/0324798 A1 Dec. 23, 2010

(30) Foreign Application Priority Data

Jun. 28, 2007 (KR) .................. 10-2007-0064168

(51) Int. Cl.
*G06F 17/00* (2006.01)
*B60K 17/00* (2006.01)
(52) U.S. Cl. .......................................... 701/51; 180/336

(58) Field of Classification Search .............. 701/51–56, 701/62, 64, 87, 93, 95, 103–105, 112; 180/170, 180/336; 280/12.12, 12.14, 237
See application file for complete search history.

(56) References Cited

U.S. PATENT DOCUMENTS

| 6,056,669 | A  | * | 5/2000 | Marshall .................. 74/335 |
| 7,335,132 | B2 |   | 2/2008 | Yeo |
| 2003/0197385 | A1 |   | 10/2003 | Onoyama et al. |
| 2004/0129251 | A1 |   | 7/2004 | Kang et al. |
| 2006/0166789 | A1 | * | 7/2006 | Katou et al. ............ 477/167 |
| 2007/0179016 | A1 | * | 8/2007 | Honda et al. ............. 477/97 |

FOREIGN PATENT DOCUMENTS

| JP | 11-141374 A | 5/1999 |
| JP | 2003-301735 A | 10/2003 |
| JP | 2004-003425 A | 1/2004 |
| JP | 2004-092502 A | 3/2004 |
| JP | 2004-232588 A | 8/2004 |
| JP | 2006-170202 A | 6/2006 |
| JP | 2006-200422 A | 8/2006 |

OTHER PUBLICATIONS

International Search Report dated May 30, 2008 of Parent Application PCT/KR2008/000876, 2 pages.

* cited by examiner

*Primary Examiner* — James Trammell
*Assistant Examiner* — Muhammad Shafi
(74) *Attorney, Agent, or Firm* — Knobbe Martens Olson & Bear, LLP

(57) ABSTRACT

The present invention makes it possible to smoothly and quickly shift a transmission from a neutral position to a driving position and prevent a shift shock and a start delay by appropriately controlling an engine output when a vehicle with an idle stop function is started after an idle stop.

6 Claims, 2 Drawing Sheets

[Figure 1]
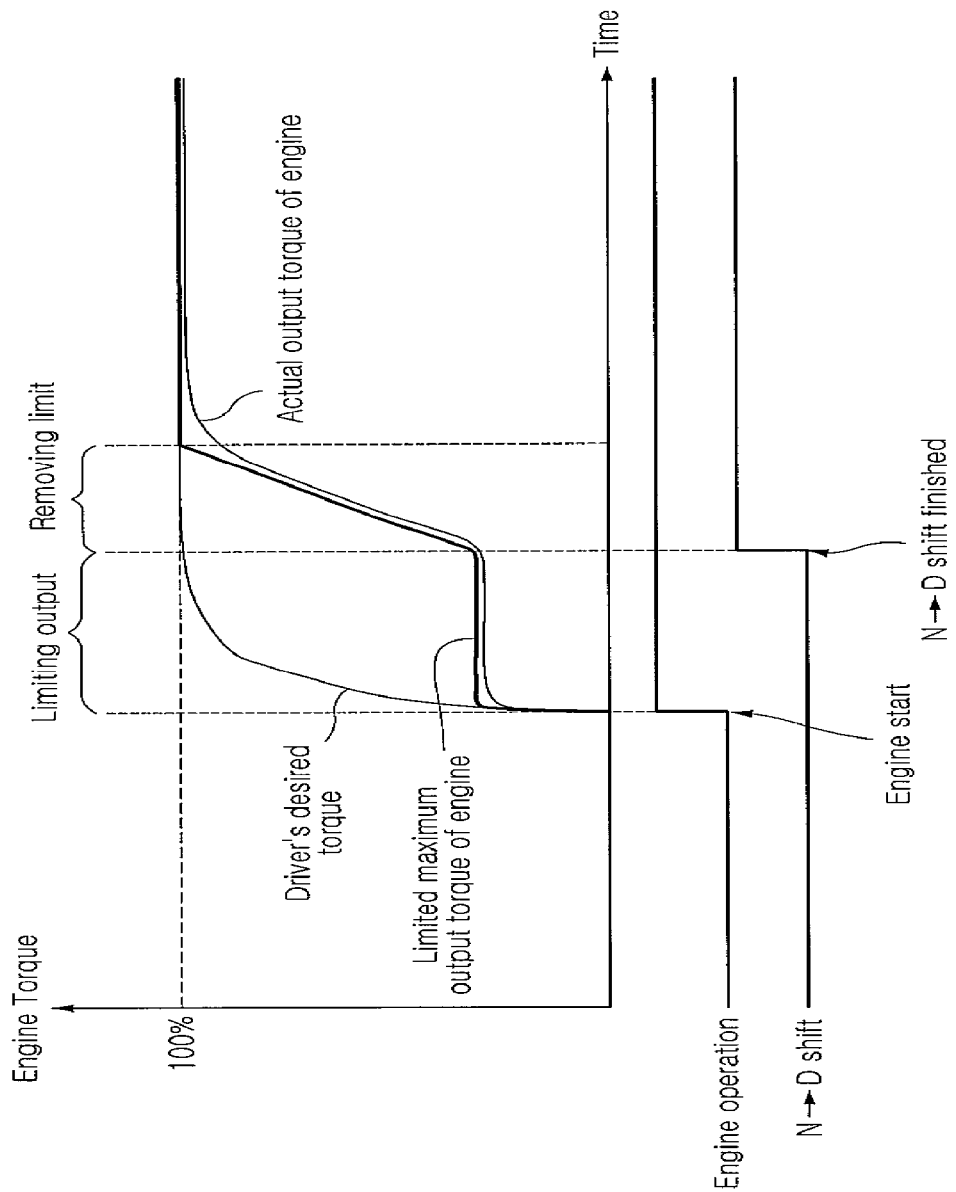

[Figure 2]
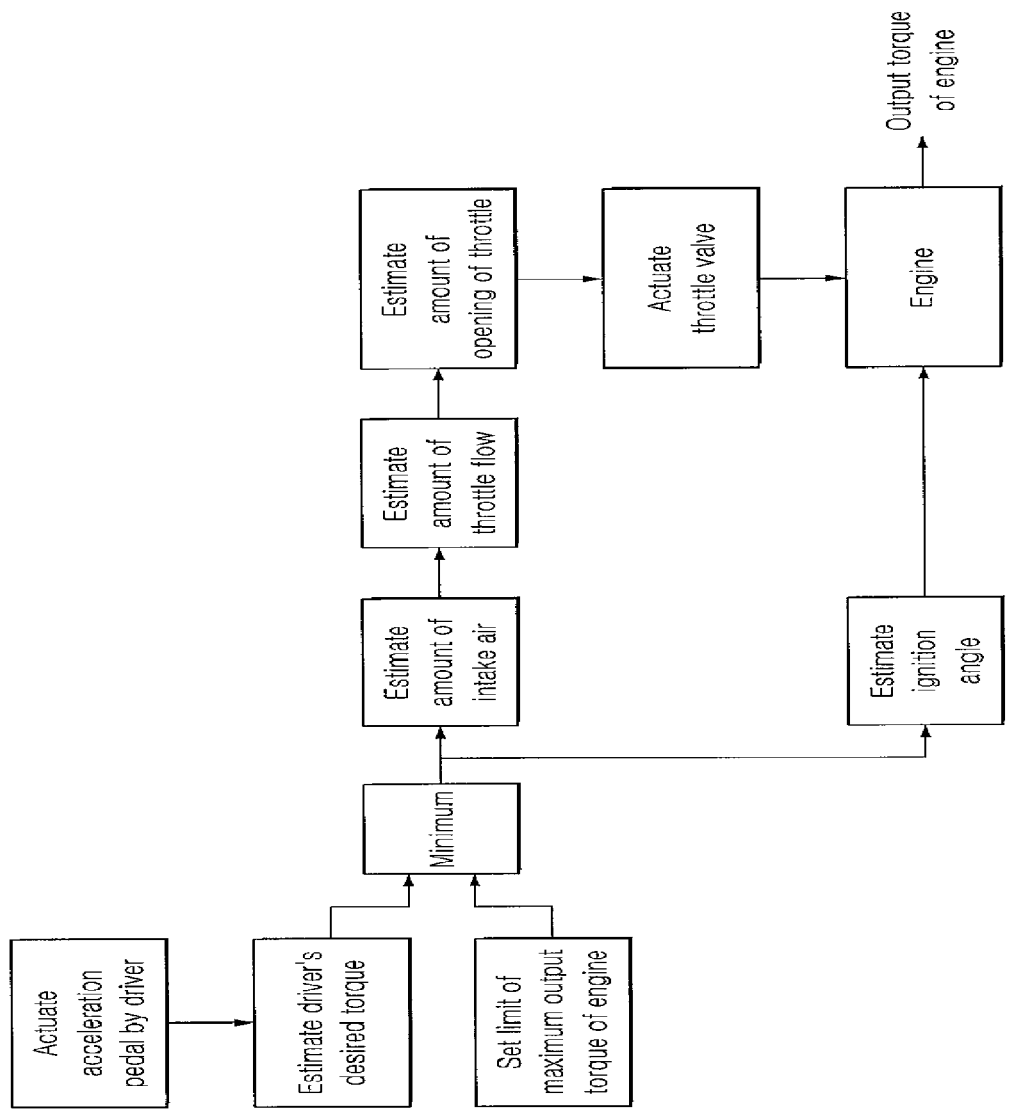

ENGINE CONTROL METHOD FOR A VEHICLE WITH IDLE STOP FUNCTION

TECHNICAL FIELD

The present invention relates an engine control method for a vehicle with an idle stop function, particularly a technology for overcome shift shock and shift delay generated when the vehicle is started after idle stop.

BACKGROUND ART

If it is possible to quickly and silently start a vehicle, it is preferable to momentarily stop the engine while the vehicle is stopped to reduce fuel consumption and exhaust gas, and a lot of hybrid vehicles are recently provided with an idle stop function.

The shift level is commonly maintained at the D-range (driving) in the idle stop; however, the transmission is shifted to the N-range (neutral) and then returned to the D-range when the driver steps on the acceleration pedal to start the vehicle, in order to softly stop and restart the engine.

When the output torque of the engine is rapidly changed or relatively very large while the transmission is shifted from the N-range to the D-range as described above, shift shock is caused and starting the vehicle is delayed because the transmission is not quickly shifted to the D-range.

A control method of reducing the input torque of the transmission by generating reverse torque in a motor of a hybrid vehicle has been used in the related art to overcome the problem, however, which decreases energy efficiency and is not sufficient to basically overcome the shift shock.

DISCLOSURE

Technical Problem

In order to overcome the problems, it is an object of the invention to provide an engine control method for a vehicle with an idle stop function that makes it possible to smoothly and quickly shift a transmission from a neutral position to a driving position and prevent a shift shock and a start delay by appropriately controlling an engine output when a vehicle with an idle stop function is started after an idle stop.

Technical Solution

In order to accomplish the object, an engine control method for a vehicle with an idle stop function according to the invention sequentially performs: limiting an output that limits the maximum output torque of an engine to a predetermined level when an engine restart condition is satisfied and the engine is started after an idle stop; and removing the limit that removes the limit of the maximum output torque of the engine by gradually increasing the limited maximum output torque as time passes.

The limiting of an output may be performed for a predetermined time within a range of 300 ms to 900 ms.

The limiting of an output may be performed until a transmission controller receives a signal signifying that shift from a neutral position to a driving position is finished.

The limiting of an output may be performed until the accumulated revolution number of times of the engine exceeds a predetermined number of times within four to fifteen after the engine is started.

The limiting of an output may be performed until the number of times of fuel injection exceeds a predetermined number of times within eight to thirty times, after the engine is started, for an engine with four cylinders A predetermined limit level of the maximum output torque of the engine in the limiting of an output may be determined at a level between 10% and 40% of the maximum output torque of the engine while the opening of a throttle valve is the maximum, within a range of above the minimum output torque needed for driving the engine and under the minimum output torque generating the shift shock.

The removing the limit may be performed to increase the limited maximum output torque of the engine with a predetermined constant inclination as time passes. The limiting of an output may include: determining, as a desired engine output torque, a smaller value between the limited maximum output torque determined by the above method and a torque determined by the driver's operation of the acceleration pedal; and estimating the amount of intake air and ignition angle needed for the desired engine output torque to activate a throttle valve and an ignition system.

Advantageous Effects

According to the invention, it is possible to smoothly and quickly shift a transmission from a neutral position to a driving position and prevent a shift shock and a start delay by appropriately controlling an engine output when a vehicle with an idle stop function is started after an idle stop.

DESCRIPTION OF DRAWINGS

FIG. 1 is a view illustrating an effect of an engine control method for a vehicle with an idle stop function according to the invention.

FIG. 2 is a view illustrating a detailed example of liming an output according to the invention.

BEST MODE

Referring to FIG. 1, the invention sequentially performs, after the engine is started, limiting an output that limits the maximum output torque of the engine to a predetermined level, when the engine restart condition is satisfied and the engine is started after an idle stop, and removing the limit that removes the limit of the maximum output torque of the engine by gradually increasing the limited maximum output torque of the engine as time passes.

That is, the invention is designed to quickly and smoothly shift the transmission by limiting the engine torque to an appropriate level while the transmission is shifted from the N-range (neutral) to the D-range (driving).

The limiting of an output may be performed for a predetermined time that is determined by a test, within a range of 300 ms to 900 ms, or may be performed until a transmission controller receives a signal signifying that the shift from the neutral position to the driving position is finished.

Further, the limiting of an output may be performed until the accumulated revolution number of times of the engine exceeds a predetermined number of times within four to fifteen after the engine is started, or may be performed until the number of times of fuel injection exceeds a predetermine number after the engine is started. Accordingly, for an engine with four cylinders, the limiting of an output may be performed until the number of times of fuel injection exceeds a predetermined number of times within eight to thirty times.

The predetermined limit level of the maximum output torque of the engine in the limiting of an output is determined at a level between 10% and 40% of the maximum output torque of the engine while the opening of a throttle valve is the maximum, within a range of above the minimum output torque needed for driving the engine and under the minimum output torque generating the shift shock.

Describing the limiting of an output in more detail, as shown in FIG. 2, the engine controller determines, as a desired engine output torque, a smaller value between the limited maximum output torque determined by the above method and a torque determined by the driver's operation of the acceleration pedal, estimates the amount of intake air and ignition angle needed for the desired engine output torque, and activates the throttle valve and the ignition system to obtain a desired limited engine output.

After the amount of intake air needed for the desired engine output torque is estimated, a throttle flow rate for securing the amount of intake air is estimated. Further, the amount of opening of a throttle valve is estimated on the basis of the throttle flow rate and the throttle valve is actuated to supply the needed amount of air into the combustion chamber of the engine, and then fuel is injected on the basis of the supplied amount of air and the output of the engine is adjusted by a spark advance or spark retard needed for obtaining a desired output.

The removing the limit is performed to increase the limited maximum output torque of the engine with a predetermined constant inclination as time passes, but may be possible even though the inclination is not constant as long as it removes the limit of the maximum output torque by gradually increasing the limit of the maximum output torque of the engine.

It is possible to prevent the shift shock and quickly and smoothly shift the transmission for driving without the problem of start delay in the related art by gradually removing the limit of the output torque of the engine after quickly and smoothly shifting the transmission from the neutral position to the driving position while momentarily limiting the output of the engine when starting the vehicle after the idle stop.

The invention claimed is:

1. An engine control method for a vehicle with an idle stop function, comprising:
   an output limiting step that limits the maximum output torque of an engine to a predetermined limit level when an engine restart condition is satisfied and the engine is started after an idle stop wherein the predetermined limit level of the maximum output torque of the engine in the output limiting step is between 10% and 40% of the maximum output torque of the engine when the opening of a throttle valve is at maximum and wherein the predetermined limit level is within a range of above the minimum output torque needed for driving the engine and under the minimum output torque that generates a shift shock; and
   a limit removing step that removes the limit of the maximum output torque of the engine by gradually increasing the limited maximum output torque as time passes, the limiting of an output and the removing the limit sequentially performed.

2. The method according to claim 1, wherein the output limit step is performed for a predetermined time within a range of 300 ms to 900 ms.

3. The method according to claim 1, wherein the output limit step is performed until a transmission controller receives a signal signifying that shift from a neutral position to a driving position is finished.

4. The method according to claim 1, wherein the output limit step is performed until the accumulated revolution number of times of the engine exceeds a predetermined number of times within four to fifteen after the engine is started.

5. The method according to claim 1, wherein the output limit step is performed until the number of times of fuel injection exceeds a predetermined number of times within eight to thirty times, after the engine is started, for an engine with four cylinders.

6. The method according to claim 1, wherein the output limit step includes:
   determining, as a desired engine output torque, a smaller value between the limited maximum output torque determined by the above method and a torque determined by the driver's operation of the acceleration pedal; and
   estimating the amount of intake air and ignition angle needed for the desired engine output torque to activate a throttle valve and an ignition system.

* * * * *